(12) United States Patent
Suzuki et al.

(10) Patent No.: US 6,641,956 B1
(45) Date of Patent: Nov. 4, 2003

(54) ELECTRODE PLATE WITH A ROUNDED CORNER AND EDGE FOR STORAGE BATTERY

(75) Inventors: Hiroyuki Suzuki, Wako (JP); Kyoichi Ariga, Wako (JP); Hiroyuki Takayasu, Koga (JP)

(73) Assignees: Honda Giken Kogyo Kabushiki Kaisha, Tokyo (JP); Sanoh Kogyo Kabushiki Kaisha, Ibaraki-ken (JP)

( * ) Notice: Subject to any disclaimer, the term of this patent is extended or adjusted under 35 U.S.C. 154(b) by 48 days.

(21) Appl. No.: 09/630,168

(22) Filed: Aug. 1, 2000

(30) Foreign Application Priority Data

Aug. 5, 1999 (JP) ............................................. 11-223030

(51) Int. Cl.⁷ ............................. H01M 4/70; H01M 4/74
(52) U.S. Cl. ...................................... 429/236; 429/211
(58) Field of Search ................................. 429/211, 233, 429/236, 237, 241, 242

(56) References Cited

U.S. PATENT DOCUMENTS

| | | | | |
|---|---|---|---|---|
| 4,865,933 A | * | 9/1989 | Blayner | 429/241 |
| 4,964,878 A | * | 10/1990 | Morris | 29/623.1 |
| 5,384,217 A | * | 1/1995 | Binder | 429/225 |
| 6,045,949 A | * | 4/2000 | Kuipers | 429/233 |
| 6,228,537 B1 | * | 5/2001 | Richter | 429/243 |
| 6,300,002 B1 | * | 10/2001 | Webb et al. | 429/94 |

FOREIGN PATENT DOCUMENTS

| | | | | |
|---|---|---|---|---|
| DE | 2459856 | | 6/1924 | |
| DE | 69414172 | | 5/1999 | |
| DE | 10037711 A1 | * | 8/2000 | ............ H01M/4/70 |
| DE | 10037711 | * | 2/2001 | ............ H01M/4/70 |
| JP | 401052376 A | * | 2/1989 | ............ H01M/4/08 |

* cited by examiner

*Primary Examiner*—Mark Ruthkosky
(74) *Attorney, Agent, or Firm*—Ladas & Parry

(57) ABSTRACT

An electrode plate of a storage battery includes a rectangular, conducting, porous base plate 12 and a paste 13 containing an active substance, spread over the surfaces of the base plate 12, and filled in the hollow spaces in the base plate by rolling so as to form layers attached to the surfaces of the base plate 12. When shaping the base plate 12, the corners C of the base plate 12 are rounded, and the edge of at least one of the sides S of the base plate 11 is rounded in cross section. Thus, burrs at the corners C and along the sides S are removed so that the exertion of excessive contact pressure on the corners C and the sides S of the base plate is prevented in the assembled state of the storage battery, whereby the occurrence of short circuit is also prevented.

20 Claims, 3 Drawing Sheets

ELECTRODE PLATE WITH A ROUNDED CORNER AND EDGE FOR STORAGE BATTERY

BACKGROUND OF THE INVENTION

1. Field of the Invention

The present invention relates to an electrode plate for a storage battery and, more particularly, to an electrode plate for a nickel-hydrogen storage battery.

2. Description of the Related Art

Referring to FIG. 4, a conventional electrode plate 1 for a nickel-hydrogen storage battery has a rectangular base plate 2, and a paste 3 containing an active substance, loaded into the base plate 2 and spread by rolling. The base plate 2 is, for example, a nickel-plated porous soft steel plate, such as a mesh, a punched plate or a foam metal plate. When the electrode plate 1 is used as a negative electrode, the paste 3 contains a hydrogen absorbing alloy, a conducting agent, a bonding agent and a dispersing agent. When the electrode plate 1 is used as a positive electrode, the paste 3 contains nickel hydroxide. A collector tab 4 is electrically joined to the base plate 2 so as to extend along the long side of the base plate 2 as shown in FIG. 5. A pair of electrodes similar to this electrode plate 1 and serving respectively as a positive electrode and a negative electrode are wound, for example, in cylindrical shape and are disposed opposite to each other in a battery can, the battery can is filled up with an electrolyte and the open end of the battery can is covered with a cover provided with a safety valve. As is generally known, the respective collecting tabs of the positive electrode plate and the negative electrode plate are connected electrically to external positive and negative terminals, respectively.

When forming the base plate 2 of the foregoing conventional electrode plate 1 for a storage battery by cutting a mesh, a punched plate or a porous plate, burrs are liable to be formed particularly in the four corners and the four sides of the rectangular base plate 2. When a pair of electrode plates formed by using base plates having burrs as positive and negative electrodes are wound in cylindrical shape so as to be opposite to each other, contact pressure in the peripheral part and the corners is high and short circuit occurs due to contact between the burrs of the pair of electrode plates.

SUMMARY OF THE INVENTION

Accordingly, it is an object of the present invention to provide an electrode plate for a storage battery, capable of preventing short circuit.

To achieve the object, the present invention provides an electrode plate for a battery including a rectangular, conducting, porous base plate having sides, and a paste containing an active substance and spread over surfaces of the base plate, and filled in hollow spaces in the base plate so as to form layers covering the surfaces of the base plate, in which at least one of corners of the porous base plate is rounded, and the edge of at least one of sides of the porous base plate is rounded in cross section.

The above and other objects, features and advantages of the present invention will become more apparent from the following description taken in connection with the accompanying drawings.

DESCRIPTION OF THE PREFERRED EMBODIMENTS

Figure 1:
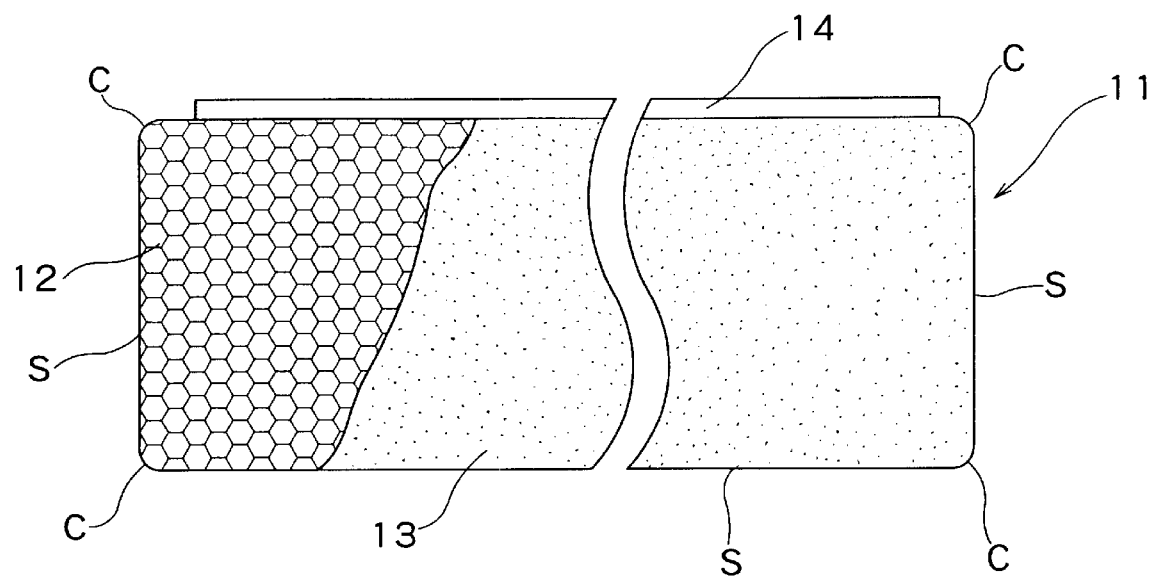
FIG. 1 is a front elevation of an electrode plate in a preferred embodiment of the present invention for a storage battery.
Figure 2:
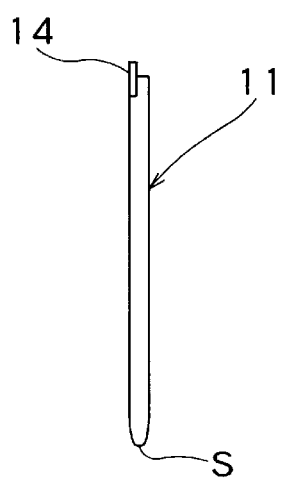
FIG. 2 is a side elevation of the electrode plate shown in FIG. 1.

Referring to FIGS. 1 and 2, an electrode plate 11 for a nickel-hydrogen storage battery, in a preferred embodiment of the present invention has a rectangular base plate 12 and a paste 13 containing an active substance, spread and rolled on the base plate 12. The base plate 12 is, for example, a nickel-plated porous soft steel plate, such as a mesh, a punched plate or a foam metal plate. When forming a negative electrode, the paste 13 of a desired viscosity and a desired temperature is prepared by kneading a mixture of powder of a hydrogen absorbing alloy, a conductive agent, a bonding agent, a dispersing agent and water. When forming a positive electrode, the paste 13 contains nickel oxyhydroxide (NiOOH). The paste 13 is spread over surfaces of the base plate 12, filled in the hollow spaces in the base plate 12 by rolling so as to form layers covering and attached to the surfaces of the base plate 12.

When the electrode plate 11 is used as a negative electrode for a battery, the hydrogen absorbing alloy contained in the paste 13 absorbs or discharges oxygen and hydrogen when the battery is charged or discharged. The electrode plate 11 is provided with a collector tab 14 joined thereto so as to extend along one of the long sides thereof. The electrode plate 11 can be used as either a positive electrode or a negative electrode. When the electrode plate 11 is intended to be used as a negative electrode, the collector tab 14 is extended along the lower long side of the base plate 12. When the electrode plate 11 is intended to be used as a positive electrode, the collector tab 14 is extended along the upper long side of the base plate 12.

The four corners C of the base plate 12 are rounded, and the edges of sides S of the base plate 12 excluding the long side S along which the collector tab 14 extends are rounded in cross section as shown in FIG. 2. The corners C and the edges of the sides S of the base plate 12 can be rounded by an ordinary rounding method. The edges of the sides S may be rounded by a crushing method using a roll or by any suitable method. Only the corners C and the edges of the sides S which are liable to cause short circuit may be rounded. The corners C and the edges of the sides S may be rounded in desired radii of curvature. In FIG. 1, a left end part including the corners C and the short side S is a leading end part, and a right end part including the corners C and the short side S is a trailing end part when winding the electrode plate 12 in cylindrical shape. The right and left end parts of the electrode plate 12 are particularly liable to cause short circuit. The lower long side S, as viewed in FIG. 1, particularly liable to cause short circuit if the lower long side S has burrs when the electrode plate 12 is wound.

Figure 3:
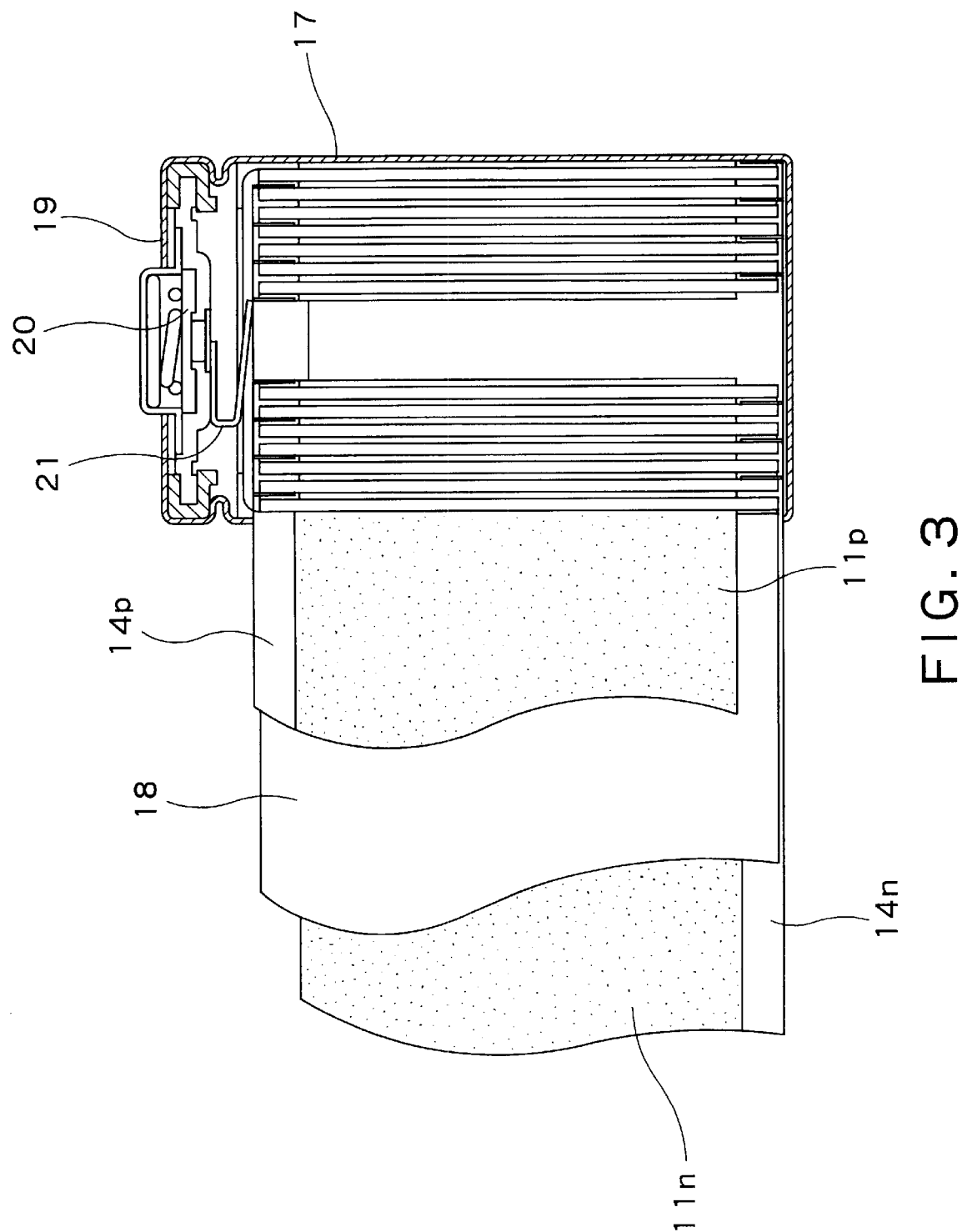
FIG. 3 is a longitudinal section of a storage battery.
Figure 4:
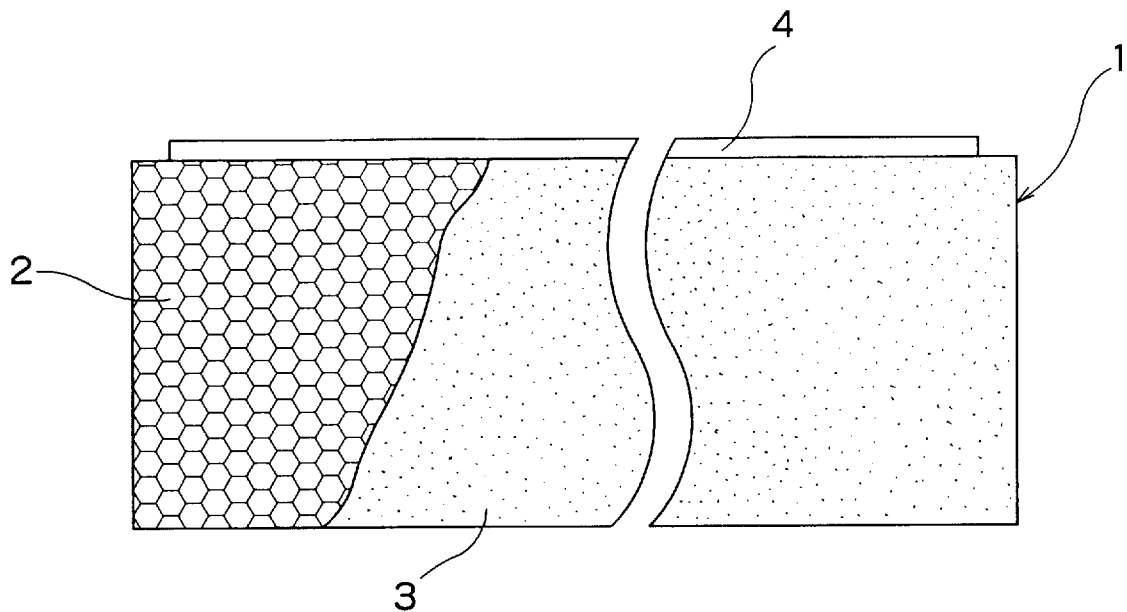
FIG. 4 is a front elevation of a conventional electrode plate for a storage battery.
Figure 5:
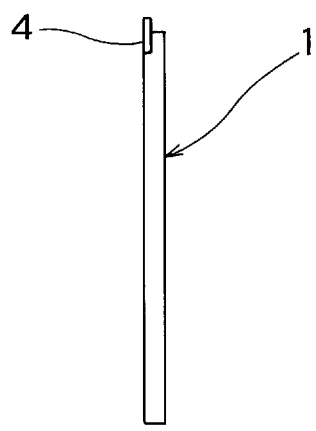
FIG. 5 is a side elevation of the electrode plate shown in FIG. 4.

FIG. 3 shows a storage battery 16 in which a pair of negative and positive electroes 11n and 11p having the above stated structure are enclosed in a battery can 17. The electrodes 11n and 11p are wound in cylindrical shape in opposing relationship as shown. These electrodes 11n and 11p are electrically insulated by an insulator sheet 18 interposed therebetween. The collector tab of the negative electrode 11n is indicated at 14n, and the collector tab of the positive electrode 11p is indicated at 14p. The closure cover of the battery 16 is shown at 19. A safety valve 20 is provided inside the cover 19, and a positive connector strip 21 connects the positive collector tab 14p with the closure cover 19.

As is apparent from the foregoing description, according to the electrode plate for a storage battery of the present invention, at least one of the corners of the conducting, porous base plate is rounded and the edges of at least one of the sides of the base plate are rounded in cross section to remove burrs formed when shaping the porous base plate, so that the exertion of an excessive contact pressure on the corners and the sides of the base plate, as well as the occurrence of short circuit is prevented.

Although the invention has been described in its preferred form with a certain degree of particularity, obviously many changes and variations are possible therein. It is therefore to be understood that the present invention may be practiced otherwise than as specifically described herein without departing from the scope thereof.

What is claimed is:

1. In a wound electrode plate for a battery, the improvements comprising:
    a rectangular, conducting, base plate having hollow spaces and first, second, third and fourth sides; and
    a paste containing an active substance, spread over surfaces of the base plate and filled in the hollow spaces in the base plate so as to form layers covering the surfaces of the base plate,
    wherein at least one of corners of the base plate is rounded, and at least one of the sides of the base plate has an edge rounded in cross section, and
    wherein the at least one of corners and the at least one of sides of the base plate are entirely at one of a starting and an ending portion of the wound electrode plate.

2. The electrode plate according to claim 1, wherein the first and second sides are longer than the third and fourth sides of the base plate, and further comprising a collector tab attached to and along an edge of the first side of the base plate.

3. The electrode plate according to claim 2, wherein the edge of the second side is not rounded in cross section.

4. The electrode plate according to claim 1, wherein the base plate is cut from a plate larger than the base plate and in which the hollow spaces are already formed.

5. The electrode plate according to claim 2, wherein the base plate is a foam metal plate.

6. The electrode plate according to claim 3, wherein the base plate is a foam metal plate.

7. The electrode plate according to claim 4, wherein the base plate is a foam metal plate.

8. The electrode plate according to claim 2, wherein:
    the second side of the base plate is opposite to the collector tab and has the edge rounded in cross section; and
    four corners of the base plate are rounded.

9. The electrode plate according to claim 3, wherein:
    four corners of the base plate are rounded.

10. The electrode plate according to claim 6, wherein:
    the second side of the base plate is opposite to the collector tab and has the edge rounded in cross section; and
    four corners of the base plate are rounded.

11. The electrode plate according to claim 7, wherein:
    four corners of the base plate are rounded.

12. The electrode plate according to claim 1, wherein the at least one of the corners of the base plate is rounded in an arc, and the edge rounded in cross section projects outward of the base plate.

13. The electrode plate according to claim 2, wherein the at least one of the corners of the base plate is rounded in an arc, and the edge rounded in cross section projects outward of the base plate.

14. The electrode plate according to claim 3, wherein the at least one of the corners of the base plate is rounded in an arc, and the edge rounded in cross section projects outward of the base plate.

15. The electrode plate according to claim 5, wherein the at least one of the corners of the base plate is rounded in an arc, and the edge rounded in cross section projects outward of the base plate.

16. The electrode plate according to claim 6, wherein the at least one of the corners of the base plate is rounded in an arc, and the edge rounded in cross section projects outward of the base plate.

17. The electrode plate according to claim 7, wherein the at least one of the corners of the base plate is rounded in an arc, and the edge rounded in cross section projects outward of the base plate.

18. The electrode plate according to claim 8, wherein the at least one of the corners of the base plate is rounded in an arc, and the edge rounded in cross section projects outward of the base plate.

19. The electrode plate according to claim 11, wherein the at least one of the corners of the base plate is rounded in an arc, and the edge rounded in cross section projects outward of the base plate.

20. The electrode plate according to claim 1, wherein the edge rounded in cross section is rounded by a crushing method using a roll.

* * * * *